Aug. 7, 1956   J. STEWART   2,757,863
NAVIGATIONAL COMPUTERS
Filed Feb. 6, 1952   2 Sheets-Sheet 1
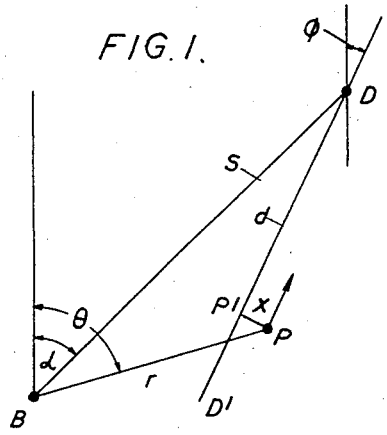
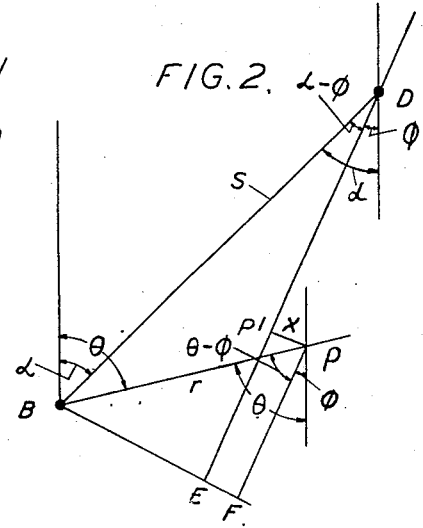
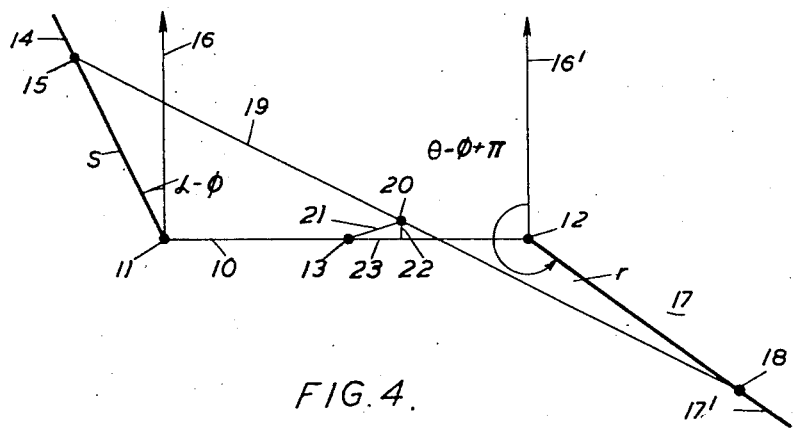
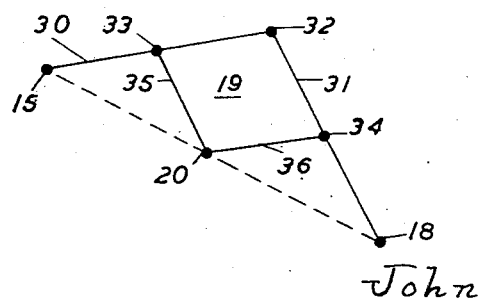
Inventor
John Stewart
By Young, Emery & Thompson
Attorneys

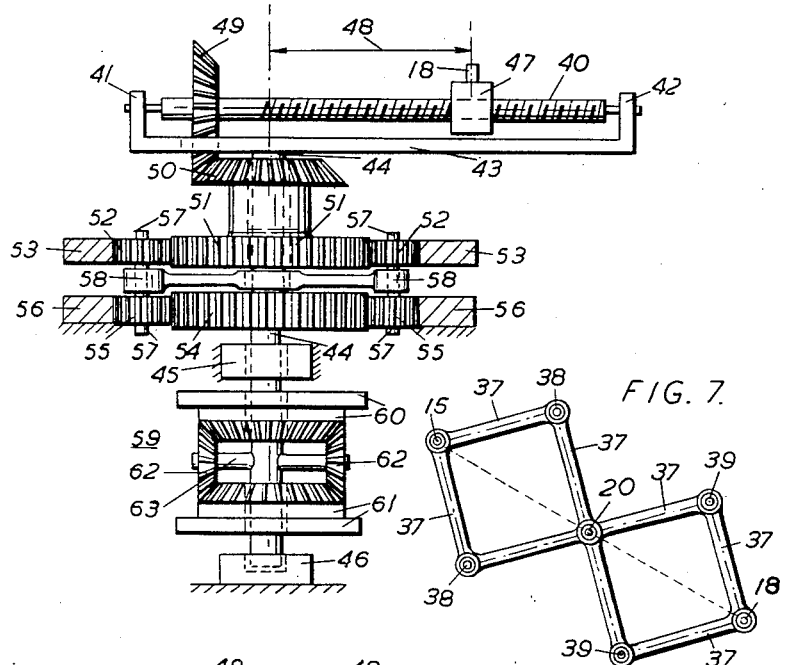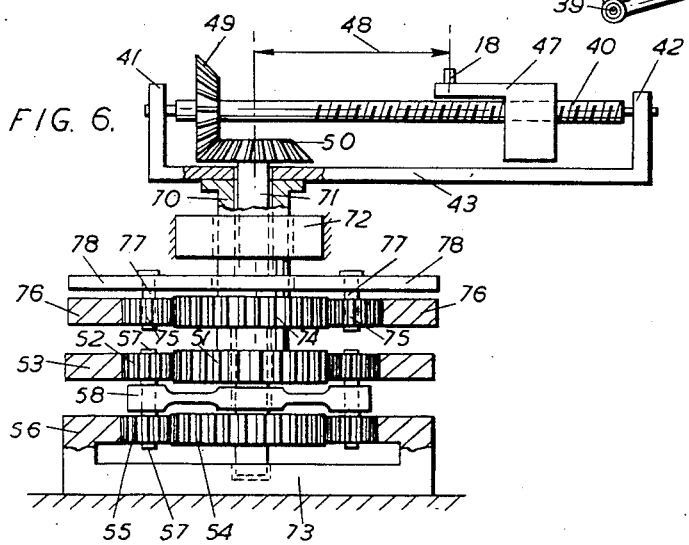

United States Patent Office 2,757,863
Patented Aug. 7, 1956

2,757,863

NAVIGATIONAL COMPUTERS

John Stewart, Hollinwood, England, assignor to Ferranti Limited, Hollinwood, England Application February 6, 1952, Serial No. 270,247

Claims priority, application Great Britain February 10, 1951

5 Claims. (Cl. 235—61)

This invention relates to navigational computors and in particular to a navigational computor designed to give the pilot of an aircraft in communication with a fixed responder beacon a continuous indication of his distance from his destination and the direction (possibly also the extent) of his deviation from a predetermined course thereto.

When a craft such as an aircraft is in communication with a fixed responder beacon, known equipment is available to produce in the aircraft—usually in the form of shaft rotations—a continuous indication of the range $r$ and bearing $\theta$ of the craft as observed at the responder beacon. Moreover the range $S$ and bearing $a$ of the craft's destination as observed at the responder beacon are constants and so may also be known in the craft.

The object of the present invention is to provide for a craft a navigational computor for deriving from the information detailed in the preceding paragraph a continuous indication of the distance of the craft from its destination and the direction and magnitude of its deviation (if any) from a predetermined course of bearing $\phi$ leading to that destination.

In accordance with the present invention a navigational computor for providing in a craft from the information $S$, $a$, $r$, and $\theta$ above defined a continuous indication of the distance of the craft from its destination and of the direction of its deviation (if any) from a predetermined course of bearing $\phi$ leading to that destination comprises first and second vector members mounted to rotate about first and second pivotal axes respectively, said axes being a fixed distance apart and providing a reference point midway between them, first and second vector distance elements movable with said member respectively and adjustable to variable distances from said axes respectively, means for adjusting the distance between the first of said axes and the first said distance element to a value $S$ representing to a predetermined scale the distance from a responder beacon to the said destination, means for adjusting the angle of the first vector member with respect to a reference direction to a value $(a-\phi)$ where $a$ is the bearing of the craft's destination as observed at the responder beacon, means for maintaining the distance between the second axis and the second distance element at a value $r$ representing to said scale the distance of the craft from said beacon and for adjusting the angle of the second vector member with respect to the said reference direction at a value $(\theta-\phi+\pi)$, where $\theta$ is the bearing of the craft as observed at the said beacon, means deriving from the positions of the distance elements a mean vector position midway between said elements, and means for deriving from the position of said mean vector position with respect to said reference point and said reference direction an indication of said distance of the craft from its destination and of the direction and magnitude of any deviation of the craft from said predetermined course.

Said either or each of vector members and associated distance member may comprise a shaft mounted for rotation coaxially with said first or second pivot axis there being secured to said shaft an arm extending radially therefrom and supporting on bearings a radial threaded rod in engagement with an internally threaded cursor, said cursor having a stud or socket representing said first or said second vector point as the case may be, the arrangement being such that rotation of said shaft about its axis causes said cursor to rotate round said axis at a radius determined by the rotation of said threaded rod about its own axis, in which case said means for maintaining the radius of the vector point at the required distance value may include a gear train the input member of which is adapted to be rotated in accordance with the distance value and the output member of which is linked to said threaded rod, the arrangement being such that for any fixed distance value said gear train becomes an epicyclic train driven by said shaft as a result of which the rotation of said shaft does not affect said radius of said vector point distance element. Said means for adjusting the angle of said vector member may include a differential or the like gear having two input members adapted to be rotated in accordance with angular adjustments involved (e. g. the values $\theta$ and $\phi$ respectively for the second vector member) and to produce as output the required rotation of said shaft (e. g. the difference of said values $\theta$ and $\phi$ for the second vector member).

Said linkage means may comprise a pantograph or a lazytongs linkage.

In the accompanying drawings:

Figures 1 and 2 are diagrams to illustrate the principle of the invention;

Figure 3 is a schematic diagram of one embodiment of the invention;

Figure 4 is a plan view to a reduced scale of a detail represented in simplified form in Figure 3;

Figure 5 is an elevation, partly in section and to an enlarged scale, of another detail of Figure 3, and Figure 6 is an elevation, also partly in section, of an alternative arrangement of the detail of Figure 5, and Fig. 7 is an alternative form of a detail to be described.

The principle of the invention will now be indicated with reference to Figures 1 and 2.

Figure 1 shows in plan the relative positions of an aircraft P, a responder beacon B, and the aircraft's destination D, at some particular moment. The straight lines B D and B P have the lengths $S$ and $r$ above referred to and the corresponding bearings at B (with respect to true north, say) of $a$ and $\theta$ degrees respectively. The straight line D¹D is the course line having the bearing at D of $\phi$ degrees with respect to true north. It is assumed that at this particular moment the craft is not on the course line, so that the point P is not on the line D¹D. Let P¹ be the foot of the perpendicular from P to the line D¹D. The distance PP¹ represents the deviation of the aircraft from the course line. Let this distance be $x$. It will be appreciated that the distance P¹D is very nearly the distance of the craft from its destination. Let this distance be $d$.

If perpendiculars are dropped from B to meet DD¹ at E (see Figure 2) and from P to meet BE (produced) at F it is clear from the geometry of the figure that $$x = BF - BE = r \sin(\theta-\phi) - S \sin(a-\phi)$$

and hence $$-\tfrac{1}{2}x = \tfrac{1}{2}[S \sin(a-\phi) + r \sin(\theta-\phi+\pi)] \quad (1)$$

And that $$d = DE - P^1E = S \cos(a-\phi) - r \cos(\theta-\phi)$$

and hence $$\tfrac{1}{2}d = \tfrac{1}{2}[S \cos(a-\phi) + r \cos(\theta-\phi+\pi)] \quad (2)$$

If therefore we can represent mechanically the vectors $$S\vert\alpha-\phi$$

and $$r\vert\theta-\phi+\pi$$

and obtain the mean of these vectors, we can deduce from the resulting mean vector the value of $d$ and the value and sense of $x$. This is achieved according to one embodiment of the invention as follows.

On some sort of fixed base represented by the base line 10 (see Figure 3) of any convenient length are provided first and second pivot axes 11 and 12 which are, say, vertical to the plane of the paper; midway between these axes is a fixed reference point 13. Mounted to rotate about pivot axis 11 is a first vector member which may be assumed for the moment to be in the form of a rod 14, slidably mounted on which is a stud 15 with its axis vertical to the plane of the paper. This stud represents the first vector point, and its radius with respect to the pivot axis 11 may be adjusted to represent the distance $S$. The angle of the rod with respect to a reference direction, say a direction 16 normal to the base line 10 at 11, is adjustable to represent the angle $(\alpha-\phi)$. Mounted to rotate about pivot point 12 is a second vector member 17. Vector member 17 resembles vector member 14 and so consists of a rod $17^1$ having a stud 18 the radius of which from the axis of pivot point 12 is adjustable to represent the distance $r$; the bearing of rod $17^1$ with respect to the reference direction—i. e. with respect to the direction $16^1$ parallel to direction 16—is adjustable to represent the angle $(\theta-\phi+\pi)$. Vector members 14 and 17 are identical mechanically and the construction of one of them will be described later.

Joining the vector points or studs 15 and 18 is a linkage 19 so designed that for all positions of these points it provides a mean vector point—which may also be in the form of a stud 20—exactly midway between them. A convenient form of such linkage will be described later. To avoid complicating the figure, linkage 19 is here represented as a straight line.

The vector points represented by studs 15, 18, and 20, will be referred to by those numbers.

Since the reference point 13 is midway between the two pivot axes 11 and 12 and the mean vector point 20 is midway between the two other vector points 15 and 18 it follows from simple geometrical considerations that the imaginary line 21 joining reference point 13 to the mean vector point 20 constitutes a vector equal to the mean of the vectors represented by the vector members; hence the displacement 22 of the mean vector point 20 from the reference point 13 in the reference direction (parallel to direction 16) is given by the expression $$\tfrac{1}{2}[S \cos (\alpha-\phi)+r \cos (\theta-\phi+\pi)]$$

which expression equals $d/2$ (from Equation 2).

Similarly the displacement 23 of the mean vector point 20 from the reference point 13 in a direction normal to the reference direction is given by $$\tfrac{1}{2}[S \sin (\alpha-\phi)+r \sin (\theta-\phi+\pi)]$$

which expression equals $-x/2$ (from Equation 1).

The displacement 22 in the reference direction thus represents the distance of the aircraft from its destination; the stud representing the mean vector point 20 may therefore be coupled to an index constrained to slide along a line which is always in the reference direction, the position of this index indicating against a calibrated scale extending in this directon the distance still to be flown. Similarly the other displacement 23 represents the extent and sense of the aircraft's departure from its course; the mean vector stud 20 may accordingly be coupled to another index constrained to slide along a line normal to the reference direction and indicating this information with respect to another scale; in this case the "sense" information—i. e. which side of the course line the aircraft is located on—is indicated by the position of the index on one or other side of the reference point. The fact that expression (1) gives a negative value of $x$ is not of importance since the "sense" of the scale may be reversed to give the correct information.

In operation, the radial position of stud 15 representing the first vector point may be set manually in accordance with the known fixed distance S from the beacon to the aircraft's destination. Then at any convenient time during the flight the course line may be defined by simultaneously adjusting, whilst maintaining them equal, the $\phi$ components of the angles between the rods 14 and $17^1$ and the respective reference directions—the known $\alpha$ component of the angle of rod 14 being preset and the $\theta$ component of the other angle being derived from the responder equipment—until the $x$ index 23 is zeroized. Rod 14 remains in this position for the rest of the flight since both components, $\alpha$ and $\phi$, of this angle are now fixed. In the meantime the shaft rotations representing $\theta$ and $r$ are continuously applied to the second vector member—as will be described in more detail later—so as to maintain the second vector point 18 continuously representative of the vector $$r\vert\theta-\phi+\pi$$

The two indexes then give a continuous indication of the distance to the destination and of the sense and value of the deviation from the course line whenever the aircraft departs from it.

It was stated above that the fixed base 10, between the two pivot points 11 and 12, might be of any convenient length. As a special case, this length may be zero, the axes of the pivot points and the reference point all coinciding. This however is usually not as practicable an arrangement as the one described.

Linkage 19 may conveniently be of the pantograph type, as shown (to a somewhat reduced scale) in Figure 4. To studs 15 and 18 are pivoted one end of each of two straight links 30 and 31 of equal length, the other ends of which are pivoted together at 32. Pivoted to mid-points 33 and 34 of the links are two half links 35 and 36 having half the length of link 30 or 31. The free end of the half links are pivoted to stud 20. The whole linkage lies in a plane normal to the axis of pivot points 11 and 12; in this example, therefore, the linkage may be considered as lying in the plane of the paper. Such a linkage forms a known kind of pantograph, the stud 20 lying at the mid point of the imaginary straight line joining studs 15 and 18 for all positions of those studs. An alternative form of pantograph linkage is shown in Figure 7 and comprises a lazytongs device having three pairs of links 37 pivoted together at the studs 15, 18 and at the mid-point stud 20 as well as at 38, and 39.

A suitable arrangement of vector member 17, which unlike the other vector member is fed with continuously changing information, will now be described with reference to Figure 5. In practice vector member 14 may be made mechanically similar to vector member 17 so that the information may easily be fed into it manually.

A threaded rod 40 has its ends journalled in bearings 41 and 42 mounted on an arm 43 extending radially from a shaft 44 coaxial with pivot point 12. As the axis of this pivot point was assumed to be vertical, it is also assumed that shaft 44 is vertical, being supported in that position by bearings 45 and 46. Rod 40 engages an internally threaded cursor 47 on which is mounted vector stud 18 so that theh radius 48 of the stud with respect to the axis of shaft 44 may be adjusted by rotating rod 40 about its own axis. Such rotation of rod 40 is applied by a pair of equal bevel gear wheels 49 and 50, secured to the shaft end of the rod 40 and mounted loosely on shaft 44 respectively.

It might be thought that the radial adjustment of stud 18 could be effected merely by rotating bevel wheel 50, the angular adjustment of threaded rod 40 (representing the vector) with respect to the reference direction being of course effected by rotating shaft 44. With such an arrangement however the latter adjustment would cause bevel wheel 49 to be carried round bevel wheel 50—which would be fixed, since the radius of the stud is not being adjusted—and as a result rod 40 would be rotated about its own axis by bevel wheel 49 and would displace the stud from its correct position. To allow of completely independent adjustments of radius and angle in accordance with the values $r$ and $\theta$ bevel wheel 50 is rotated in accordance with the value $r$ by way of a special gear train, which will now be described.

Below bevel wheel 50 and secured to this wheel coaxially with the shaft 44 is an upper sun wheel 51 engaging an upper group of two or more planet wheels 52 each of which also engages the internal gear ring of an upper concentric gear or annulus 53. This assembly of coplanar gear wheels is duplicated below it—there being a lower sun wheel 54 engaging a lower group of planet wheels 55 each of which also engages a lower internal gear ring or annulus 56. Each planet wheel 52 of the upper group is loosely mounted on a spindle 57 which extends downwards to the corresponding planet wheel 55 of the lower group, which is also loosely mounted on this spindle. Between the two assemblies of gears the planet wheel spindles 57 are secured to and correctly located by a common spider 58 coaxial with shaft 44 but not fixed to it. The lower sun wheel 54 is secured to shaft 44; the lower annulus 56 is fixed relative to the apparatus; the upper annulus 53 is rotated in dependence on the distance $r$. Shaft 44 is rotated, by a differential gear 59 which will be described shortly, in accordance with the angle $(\theta-\phi+\pi)$ and hence in dependence on the angle $\theta$.

To simplify the drawing, spider 58 is depicted as being supported axially by the upper surface of the lower sun wheel 54 and itself supporting axially the upper sun wheel 51, slight clearances being shown for clarity. In actual practice it is usually more desirable to interpose ball bearings to take the axial thrust of the upper components. The axial support for annulus 53 has been omitted to simplify the drawing.

With this arrangement, when the angle $\theta$ is fixed, the lower sun wheel 54 is fixed because shaft 44 is fixed and in consequence the lower group of planet wheels 55 are fixed between the lower sun wheel 54 and the fixed lower annulus 56. Each of the spindles 57 is thus fixed axially—i. e. is prevented from being revolved round the shaft—and so therefore is each planet wheel 52 of the upper group. Planet wheels 52 thus act as ordinary gear wheels with fixed axes and transmit the "input" rotation of the upper annulus wheel 53 (in accordance with the distance $r$) to threaded rod 40 by way of the upper sun wheel 51 and bevel gears 50 and 49. The relationship between the angular position of annulus 53 and the value of the distance $r$ as represented by the radius 48 is of course determined in part by the ratio of bevel gears 50 and 49 and by the pitch of the screwed rod 40.

Suppose now the distance $r$ is fixed and the angle $\theta$ is to be altered by rotation of shaft 44. With the lower sun wheel 54 now acting as input, the gear train becomes an epicyclic train driven by the shaft, the lower group of planet wheels 55 being caused to ride round annulus 56. This motion of the lower group of planet wheels round the shaft is imparted to the upper group of planet wheels 52 by the common spindles 57. As the upper annulus 53 is fixed too ($r$ being fixed) and as the upper assembly of gears is exactly similar to the lower, the effect of the rotation of the upper group of planet wheels 52 round the shaft is to impart to the upper sun wheel 51 the exact motion of the lower sun wheel 54. Sun wheel 51 accordingly behaves as if it were secured to the shaft, with the result that bevel wheel 50 rotates with the supporting arm 43 of the threaded rod; bevel wheel 49 therefore does not rotate about its own axis, and the position of the cursor 47 remains unchanged.

In practice, of course, $r$ and $\theta$ are usually changing simultaneously, but the effect of each is confined to its own part of the apparatus as described in the preceding paragraph.

The rotation of the shaft 44 in dependence on the angle $(\theta-\phi+\pi)$ is very simply effected by a differential gear 59 having two input members in the form of two bevel wheels 60 and 61 mounted loosely on shaft 44 and engaging between them an output member in the form of two or more bevel wheels 62 each of which is pivoted loosely at the end of and coaxial with a spindle 63 extending radially from the shaft. The axial supports of bevel wheels 60 and 61 are not shown.

As soon as the course line has been set, the lower input bevel 61 is rotated clockwise by hand to the angular position $2(\phi-\pi)$ from a zero position corresponding to the reference direction 16¹ of Figure 3; this angle is then constant. The upper input bevel 60 is then rotated in the opposite direction in accordance with the varying angle $2\theta$. Shaft 44 thus becomes rotated to the angular position corresponding to the difference between half these angles, i. e., to the position $(\theta-\phi+\pi)$, in accordance with the principle of operation of a differential gear of this kind.

If desired the apparatus of Figure 5 may be operated in an alternative manner viz.: the annulus 53 may be fixed and the $r$ input applied instead to annulus 56. The result is that, assuming as before that sun wheel 54 were fixed, the rotation of annulus 56 causes the lower planet wheels 55 to be driven round this sun wheel, thereby causing the upper planet wheels 52 to be driven round the central axis. The upper train behaves as an epicyclic train in which the annulus is fixed and the input drive is applied to the cage. The upper sun wheel 51 rotates at the same speed as before but in the opposite direction and the radius 48 of the cursor is correspondingly adjusted. This arrangement however has the disadvantage of entailing more backlash in the gear train as compared with the first described manner of operation.

The above-described arrangement of the second vector member 17 with its two systems of input gears may be widely modified in form whilst still operating on the principles set forth. A simple modification may for instance be made to allow $\theta$ and $(\phi-\pi)$ to be applied to the differential in the same angular direction. Such an arrangement is shown in Figure 6, in which those components that are similar to components depicted in Figure 5 are given the same references. Arm 43 this time carried by a sleeve 70 coaxial with pivot point 12, rather than by a shaft, whereas bevel wheel 50 is secured to a shaft 71 located coaxially within sleeve 70. The combination of sleeve and shaft is supported by bearings 72 and 73. Sleeve 70 is secured to a sun wheel 74 engaging two or more planet wheels 75 which also engage the internal gear ring of a concentric gear wheel or annulus 76. Planet wheels 75 are carried on spindles 77 secured to a cage 78 which fits loosely on sleeve 70 and is supported by bearings that are not shown.

Below gears 74 to 76 is a group of gear wheels and a spider similar to components 51 to 58 of Figure 5. Sun wheel 51 is in this case secured to sleeve 70 and sun wheel 54 to shaft 71. The fixed annulus 56 is shown as forming part of bearing 73.

The fact that bevel wheel 50 is now located between arm 43 and rod 40 and hence in the path of cursor 47 necessitates a modification to the cursor to allow small values of $r$ to be represented.

The values of $\theta$ and $(\phi-\pi)$ are represented in this arrangement by angular displacements in the same direction (counterclockwise, to accord with Figure 3) of cage 78 and annulus 76 respectively. Clearly the result of this is to cause the rotation of sleeve 70 in dependence on the angle $(\theta-\phi+\pi)$. The relationships between the values of these angles and the extents of the rotations of cage 78 and annulus 76 are of course determined by the gear ratios. The value $\pi$ may of course be accounted for by a pre-set rotation of annulus 76 so that only the values of $\theta$ and $\phi$ require to be fed in.

The independent control of $r$ and $\theta$ is effected in the same manner as in the apparatus of Figure 5. Suppose $\theta$ is varied whilst $r$ is fixed. As $r$ is fixed, annulus 53 is fixed, so that the rotation of sun wheel 51 by sleeve 70 in proportion to the angle $\theta$ effects a corresponding rotation of sun wheel 54 and hence of shaft 71. Sleeve 70 and shaft 71 thus rotate together as if they were solid, there is no rotation of bevel wheel 50 relative to arm 43, and the angular position of that arm is altered without disturbing the radial position of the cursor.

Similarly if $\theta$ is fixed and $r$ varied. As $\theta$ is fixed, sleeve 70 is fixed, so that the rotation of annulus 53 in proportion to the distance $r$ causes the upper planet wheels 52 to be carried round sun wheel 51 in an epicyclic manner. The corresponding motion of the lower planet wheels 55 riding round the fixed annulus 56 drives sun wheel 54 and hence, through shaft 71 and bevel wheels 50 and 49, causes the appropriate radial displacement of the cursor 47.

The lowest and middle gear trains of Figure 6 look exactly similar to the corresponding gear trains of Figure 5, and have accordingly been given the same references. It will however be appreciated that sun wheel 51 in Figure 6 controls the angle of the vector member, whereas in Figure 5 it controls the radius.

It will be appreciated that the arrangement of Figure 6 in addition to affording the advantage of allowing the angles $\theta$ and $\phi$ to be fed in the same direction has the advantage over the Figure 5 arrangement of greater compactness.

If a remote indication of $x$ and $d$ is required, or if the computer is to be included as part of an automatic control system, the displacements $x$ and $d$ of the mean vector point from the reference point may be represented electrically by using suitable transducers, responsive to the displacement of the mean vector point in the appropriate directions. A transducer for representing values of $d$ for instance, may consist of a potentiometer formed by a number of closely spaced conductors arranged parallel to each other and to the base line of the pivot points, and engaged by a wiper contact attached to the pantograph linkage at its mid point, the several conductors being connected to individual tapping points on a potential divider. A similar conductor array with its members arranged perpendicular to the base line may be employed to co-operate with a second contact wiper on the linkage at the mid point. Other forms of transducer will readily suggest themselves.

The computer may perhaps also permit the pilot to manoeuvre his aircraft in an orbit around a desired destination. In this case the bearing of his homing track is continuously varying and at all times the value of $x$ must be zero. The pilot flies so as to keep his distance $d$ from the destination constant whilst some sort of servo mechanism varies continually the angle $\phi$, which in this case represents the bearing at the destination of the aircraft. The servo mechanism may conveniently be designed to derive its error voltage from a potentiometer or the like controlled by the $x$ displacement of the mean vector point and to apply its output to maintain the feed to the apparatus such that $x$ is maintained zero.

The various kinds of apparatus described above with reference to Figures 5 and 6 for the second vector member and second distance member may also be employed for operating the first vector member and first distance member.

I claim:

1. A navigational computer for providing a continuous indication of the distance of a craft from its destination and of the direction and magnitude of any deviation from a predetermined course of bearing $\phi$ leading to that destination comprising first and second vector members mounted to rotate about first and second pivotal axes respectively, said axes being a fixed distance apart and providing a reference point midway between them, first and second vector distance elements movable with said members respectively and adjustably mounted to variable distances from said axes respectively, the distance between the first of said axes and the first said distance element being adjustable to a value S representing to a predetermined scale the distance from a responder beacon to the said destination, the angle of the first vector member with respect to a reference direction being adjustable to a value $(\alpha-\phi)$ where $\alpha$ is the bearing of the craft's destination as observed at the responder beacon, means for adjusting the distance between the second axis and the second distance element at a value $r$ representing to said scale the distance of the craft from said beacon and for adjusting the angle of the second vector member with respect to the said reference direction at a value $(\theta-\phi+\pi)$ where $\theta$ is the bearing of the craft as observed at the said beacon, means for deriving from the positions of the distance elements a mean vector position midway between said elements, and means for deriving from said mean vector position with respect to said reference point and said reference direction indications of said distance of the craft from its destination and of the direction and magnitude of any deviation of the craft from said predetermined course, said indications means for at least one of said vector members and corresponding distance element comprising a shaft rotatably mounted about said second pivot axis, and having an arm carried by said shaft and extending radially therefrom, a radial threaded rod rotatably carried by said arm, an internally threaded cursor engaged on said rod, the corresponding distance adjusting means including a gear train having an input member to be rotated in accordance with the value of the distance and having an output member operatively connected to said threaded rod, said gear train for any fixed value of said distance constituting an epicyclic train driven by said shaft whereby rotation of the shaft does not affect the radius of said distance element, and said means for maintaining the angle of said vector member includes a differential gear having two input members adapted to be rotated for effecting the required adjustment of the angle of the vector member, and an output member operatively connected to said input members.

2. A navigational computer for providing a continuous indication of the distance of a craft from its destination and of the direction and magnitude of any deviation from a predetermined course of bearing $\phi$ leading to that destination comprising first and second vector members mounted to rotate about first and second pivotal axes respectively, said axes being a fixed distance apart and providing a reference point midway between them, first and second vector distance elements movable with said members respectively and adjustably mounted to variable distances from said axes respectively, the distance between the first of said axes and the first said distance element being adjustable to a value S representing to a predetermined scale the distance from a responder beacon to the said destination, the angle of the first vector member with respect to a reference direction being adjustable to a value $(\alpha-\phi)$ where $\alpha$ is the bearing of the craft's destination as observed at the responder beacon, means for adjusting the distance between the second axis and the second distance element at a value $r$ representing to said scale the distance of the craft from said beacon and for adjusting the angle of the second vector member with respect to the said reference direction at a value $(\theta-\phi+\pi)$ where $\theta$ is the bearing of the craft as observed at the said beacon, means for deriving from the positions of the distance elements a mean vector position midway between said elements, and means for deriving from said mean vector position with respect to said reference point and said reference direction indications of said distance of the craft from its destination and of the direction and magnitude of any deviation of the craft from said predetermined course, said indicating means for the means deriving a mean vector position comprising a pantograph linkage connected to both said distance elements.

3. A navigational computer for providing a continuous indication of the distance of a craft from its destination and of the direction and magnitude of any deviation from a predetermined course of bearing $\phi$ leading to that destination comprising first and second vector members mounted to rotate about first and second pivotal axes respectively, said axes being a fixed distance apart and providing a reference point midway between them, first and second vector distance elements movable with said members respectively and adjustably mounted to variable distances from said axes respectively, the distance between the first of said axes and the first said distance element being adjustable to a value S representing to a predetermined scale the distance from a responder beacon to the said destination, the angle of the first vector member with respect to a reference direction being adjustable to a value $(\alpha-\phi)$ where $\alpha$ is the bearing of the craft's destination as observed at the responder beacon, means for adjusting the distance between the second axis and the second distance element at a value $r$ representing to said scale the distance of the craft from said beacon and for adjusting the angle of the second vector member with respect to the said reference direction at a value $(\theta-\phi+\pi)$ where $\theta$ is the bearing of the craft as observed at the said beacon, means for deriving from the positions of the distance elements a mean vector position midway between said elements, and means for deriving from said mean vector position with respect to said reference point and said reference direction indications of said distance of the craft from its destination and of the direction and magnitude of any deviation of the craft from said predetermined course, said indicating means for said means for maintaining the distance between at least one of said axes and the associated distance element and for adjusting the angle of the associated vector member comprising two sets of epicyclic gear trains each having a sun wheel and a gear ring and planet wheels meshing with the sun wheel and gear ring, the two sets of planet wheels being mounted on spindles, a cage carrying said spindles of both sets, operative connections between the sun wheel of the first set of gear trains and said second distance element, the sun wheel of the second set being connected to the vector member, the ring gear of one of said sets being rotatable according to the value of the distance and the ring gear of the other set being fixed.

4. A navigational computer for providing a continuous indication of the distance of a craft from its destination and of the direction and magnitude of any deviation from a predetermined course of bearing $\phi$ leading to that destination comprising first and second vector members mounted to rotate about first and second pivotal axes respectively, said axes being a fixed distance apart and providing a reference point midway between them, first and second vector distance elements movable with said members respectively and adjustably mounted to variable distances from said axes respectively, the distance between the first of said axes and the first said distance element being adjustable to a value S representing to a predetermined scale the distance from a responder beacon to the said destination, the angle of the first vector member with respect to a reference direction being adjustable to a value $(\alpha-\phi)$ where $\alpha$ is the bearing of the craft's destination as observed at the responder beacon, means for adjusting the distance between the second axis and the second distance element at a value $r$ representing to said scale the distance of the craft from said beacon and for adjusting the angle of the second vector member with respect to the said reference direction at a value $(\theta-\phi+\pi)$ where $\theta$ is the bearing of the craft as observed at the said beacon, means for deriving from the positions of the distance elements a mean vector position midway between said elements, and means for deriving from said mean vector position with respect to said reference point and said reference direction indications of said distance of the craft from its destination and of the direction and magnitude of any deviation of the craft from said predetermined course, said indications means for said means for maintaining the distance between at least one of said axes and the associated distance element and for adjusting the angle of the associated vector member comprising two sets of epicycle gear trains each having a sun wheel and a gear ring, and planet wheels meshing with the sun wheel and gear ring, the two sets of planet wheels being mounted on spindles, a cage carrying said spindles of both sets, operative connections between the sun wheel of the first set of gear trains and said second distance element, the sun wheel of the second set being connected to the second vector member, the ring gear of one of said sets being rotatable according to the distance value, the ring gear of the other set being fixed, a differential gear having two input bevel wheels to be rotated according to the adjustments required for the angle of the vector member, and a set of bevel pinions meshing with said bevel wheels, spindles carrying said pinions, and an output member carrying said spindles and connected to the sun wheel of the second of said sets of gear trains.

5. A navigational computer for providing a continuous indication of the distance of a craft from its destination and of the direction and magnitude of any deviation from a predetermined course of bearing $\phi$ leading to that destination comprising first and second vector members mounted to rotate about first and second pivotal axes respectively, said axes being a fixed distance apart and providing a reference point midway between them, first and second vector distance elements movable with said members respectively and adjustably mounted to variable distances from said axes respectively, the distance between the first of said axes and the first said distance element being adjustable to a value S representing to a predetermined scale the distance from a responder beacon to the said destination, the angle of the first vector member with respect to a reference direction being adjustable to a value $(\alpha-\phi)$ where $\alpha$ is the bearing of the craft's destination as observed at the responder beacon, means for adjusting the distance between the second axis and the second distance element at a value $r$ representing to said scale the distance of the craft from said beacon and for adjusting the angle of the second vector member with respect to the said reference direction at a value $(\theta-\phi+\pi)$ where $\theta$ is the bearing of the craft as observed at the said beacon, means for deriving from the positions of the distance elements a mean vector posiiton midway between said elements, and means for deriving from said mean vector position with respect to said reference point and said reference direction indications of said distance of the craft from its distination and of the direction and magnitude of any deviation of the craft from said predetermined course, said indications means for at least one of said vector members and associated distance element being actuated by means comprising three sets of epicyclic gear trains each having a sun wheel, a ring gear, and sets of planet pinions meshing with the sun wheel and ring gear, a first cage carrying the first set of planet pinions, a second cage carrying the second and third sets of planet pinions, the first and second sun wheels being connected to said vector member, the third sun wheel being connected to said second distance element, the first ring gear and the first cage being rotatable according to the adjustments required for the angle of the vector member, the second ring gear being adjustable according to the distance value, and the third ring gear being fixed.

References Cited in the file of this patent

UNITED STATES PATENTS 2,431,919   Clark ------------------ Dec. 2, 1947

OTHER REFERENCES

"Computer for Aeronautical Navigation," by O. H. Schuck; Extract from Proceedings.

Electronic Conference, volume III, 1947, pages 210–218.